(12) United States Patent
Dutch et al.

(10) Patent No.: US 9,721,109 B2
(45) Date of Patent: *Aug. 1, 2017

(54) PRIVACY SCREEN-BASED SECURITY (71) Applicant: EMC Corporation, Hopkinton, MA (US)

(72) Inventors: Michael John Dutch, Saratoga, CA (US); Christopher Hercules Claudatos, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,183

(22) Filed: Mar. 8, 2016

(65) Prior Publication Data
US 2016/0188888 A1 Jun. 30, 2016

Related U.S. Application Data (63) Continuation of application No. 14/225,033, filed on Mar. 25, 2014, now Pat. No. 9,311,496.

(51) Int. Cl.
*G06F 21/60* (2013.01)
*G06F 21/62* (2013.01)
*H04L 29/08* (2006.01)
*G06F 9/445* (2006.01)

(52) U.S. Cl.
CPC ........ *G06F 21/604* (2013.01); *G06F 21/6245* (2013.01); *G06F 9/4451* (2013.01); *G06F 2221/2149* (2013.01); *H04L 67/303* (2013.01); *H04L 67/306* (2013.01)

(58) Field of Classification Search
CPC .............. G06F 21/604; G06F 21/6245; G06F 2221/2149; H04L 67/303; H04L 67/306
See application file for complete search history.

(56) References Cited

U.S. PATENT DOCUMENTS

| | | | |
|---|---|---|---|
| 8,261,361 B2* | 9/2012 | Liu ..................... | G06F 21/6218 726/16 |
| 8,831,567 B2* | 9/2014 | Kim ..................... | G06F 21/6218 455/411 |
| 8,874,162 B2* | 10/2014 | Schrader ............... | H04W 12/08 340/670 |
| 2008/0020803 A1* | 1/2008 | Rios ....................... | H04M 1/667 455/565 |
| 2009/0165145 A1* | 6/2009 | Haapsaari ......... | H04M 1/72563 726/28 |
| 2011/0265179 A1* | 10/2011 | Newman ............... | G06F 21/604 726/22 |

\* cited by examiner

*Primary Examiner* — Theodore C. Parsons
*Assistant Examiner* — Thomas Ho
(74) *Attorney, Agent, or Firm* — Blakely, Sokoloff, Taylor & Zafman LLP (57) ABSTRACT

A system for privacy screen-based security comprises an input interface and a processor. The input interface is configured to receive authentication information. The processor is configured to, in the event authentication is determined to be successful, provide a privacy access screen, wherein the privacy access screen provides access to a set of applications or data, and determine whether to automatically transition to a new privacy screen, wherein the transition to the new privacy screen is automatic under a specific set of circumstances.

18 Claims, 10 Drawing Sheets

| Privacy Screen: Teen | Lease = 1 hour | Type: Include | |
|---|---|---|---|
| Application Category | Application Selection | Restriction Type | Restriction |
| Books | Exclude | Marvel | T+ |
| Browsers | Include | Content | Safe |
| Education | All | | |
| Games | Exclude | ESRB | M |
| Messaging | Include | Network | Wifi |
| Music | All | | |
| News | Exclude | | |
| Sports | All | | |
| Video | Include | MPAA<br>TV Guidlines | R<br>TV-14 |
| Telephone | Domestic | Minutes | 10 |

Privacy Screen Definition Creator

Privacy Screen Name: [          ]

Privacy Screen Type: [Include] [Exclude]

Privacy Screen Lease: [10 min] [1 hr] [6 hr] [Other] [None]

Add Filter:

[Application Category] [Application Selection] [Restriction Type] [Restriction]

Filters:

| Application Category | Application Selection | Restriction Type | Restriction |
|---|---|---|---|
| Books | Exclude | Marvel | T+ |
| Browsers | Include | Content | Safe |

[Set Transition Rule]

PRIVACY SCREEN-BASED SECURITY

CROSS REFERENCE TO OTHER APPLICATIONS

This application is a continuation of co-pending U.S. patent application Ser. No. 14/225,033, entitled PRIVACY SCREEN-BASED SECURITY filed Mar. 25, 2014 which is incorporated herein by reference for all purposes.

BACKGROUND OF THE INVENTION

Single-user systems (e.g., tablet computers, smartphones) do not provide a way to conveniently and securely share access to selected functionality when physical access to the system is provided to different users. Systems and applications that support multiple user accounts suffer the same limitations as single-user systems when physical access is shared.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Privacy-screen based security is disclosed. A system for controlling user access comprises an input interface configured to receive authentication information, and a processor configured to, in the event authentication is successful, provide a full access privacy screen, wherein the full access privacy screen provides access to a set of applications or data, determine a selection of one of a set of privacy screens, and provide the selected privacy screen, wherein the selected privacy screen limits access to a subset of the set of application or data. The system for controlling user access additionally comprises a memory coupled to the processor and configured to provide the processor with instructions.

In some embodiments, a system for controlling user access using privacy-screen based security is disclosed. A system for privacy screen-based security for a computer system comprises a set of privacy screens including an all access privacy screen. The all access privacy screen provides user access to all applications available to the user, with no restrictions on the applications. Other privacy screens each provide a subset of the access available via the all access privacy screen: applications can be hidden to a user or provided with restrictions. The primary user of the system can configure privacy screens for any appropriate set of circumstances—e.g., a teenager privacy screen (e.g., a privacy screen for use when the primary user hands the device to his teenager), a coworker privacy screen, a stranger privacy screen, a weekend privacy screen (e.g., a privacy screen for use by the primary user on the weekends—e.g., hiding all work-related applications), a work privacy screen (e.g., a privacy screen for user by the primary user while at work—e.g., hiding applications that are not work-related), etc. The primary user of the system can additionally configure one or more privacy screen transitions associated with the privacy screen. A privacy screen transition configures an automatic transition to a particular privacy screen under a specific set of circumstances. For instance, if the device detects that it is at a location corresponding to a users' workplace on a weekday, it will automatically transition to the work privacy screen. Manual transitions can additionally be initiated by the user (e.g., by pushing a button, by executing a gesture, by making a voice command, etc.). In some embodiments, transitions must be authenticated (e.g., by entering a password, using biometric information, etc.). In some embodiments, a transition from an all access privacy screen to a different privacy screen determines authentication automatically (e.g., without prompting for additional authentication).

In a typical usage of the system, when the system is turned on, a no access privacy screen is provided (e.g., the user has no access to system capabilities). The user can then authenticate the all access privacy screen for typical usage. When the user determines that a privacy screen is necessary (e.g., he wants to hand the device to his teenager), he makes an indication to transition to a new privacy screen and selects the appropriate privacy screen. The privacy screen is displayed, and the user can safely hand away the device.

In some embodiments, the notion of a privacy screen to provide a convenient and inviolable means of sharing selected resources and capabilities in a private context is disclosed. The private context means that an unidentified user has system access while it is operating under the credentials of another user. While such a situation may not be considered secure in the sense that all users of a system are provided access based on their identity, it enhances security by addressing many common situations where such identification is not possible, practical, or convenient.

In some embodiments, privacy screens present a subset of the resources and capabilities that the authenticated user has access to. Definition of privacy screens and the transition between privacy screens is performed by a combination of automatic and manual actions. Systems that implement privacy screens eliminate dependencies on applications and external services to protect system integrity and audit readiness of the authenticated user.

In some embodiments, a privacy screen is a view that an identified or unidentified user is presented of a system. It provides access to a subset of the resources and capabilities that a system provides to an authorized user. The system is protected from undesirable alteration by limiting which applications are visible and accessible, which system actions may be performed, and which resources may be accessed by the system and application. Such restrictions also improve the usability of the system for specific tasks by removing distractions and temptations to the unidentified user.

In some embodiments, a privacy screen not only presents the applications that may be executed, it also defines the content that may be accessed and the actions that may be performed. For example, actions (indicated by a graphical user interface (GUI) element, command, gesture, or other means) may be restricted so system settings cannot be altered from a privacy screen. A privacy screen is created manually by an authorized user of the system, automatically by policy/template, or a combination of these mechanisms. The default privacy screens are "No Access" and "Full Access", corresponding to the resources and capabilities provided by the system before and after a user's identity has been authenticated. The default privacy screens can be implemented without any change to the apparent operation of a system.

In some embodiments, multiple methods can be used to define a privacy screen, including specifying which individual applications should be included. For example, dragging and dropping an application into a special folder could be used to create a privacy screen. A system may also automatically create privacy screens.

In some embodiments, the operating environment of the system implements privacy screens. Applications that run on the system are not aware of privacy screens. The specific method of implementation depends upon the architecture of the system but in general involves the system components responsible for processing system input, processing system output, and dispatching processes. System input is ignored when disallowed operations are attempted (e.g., actions that enable system configuration). System output only displays items defined in the current privacy screen. Attempts to access disallowed content are either not possible (when there is no method to interact with such content) or rejected (when an included application provides a method to request such content). The method which the system uses to dispatch processes is also modified to control the launching of applications and effect privacy screen controls.

In some embodiments, a parent wishes to let their child watch a video in the back seat of the car to keep their child busy while on a long trip. Without privacy screens the parent risks exposure, loss, damage, or reconfiguration of other resources on their computer. Privacy screens allow the parent to conveniently share the device with the child, confident that only appropriate content will be viewed. In some embodiments, a computer user shares a device for both business and personal use and occasionally allows handymen and friends to access the internet from this computer. Privacy screens enable the user to automatically transition from a business desktop to a personal desktop outside of normal working hours. Note that this illustrates how privacy screens add functionality when only the identified user is involved. In this example, privacy screens also allow the identified user to restrict use of their computer for safe browsing, hiding all other applications and data from handymen or other occasional users. In some embodiments, many complex systems (e.g., storage servers) are configured and supported using mobile devices running management software. Using privacy screens allows rapid transition between a support desktop and a general desktop, providing a level of isolation when access to powerful and dangerous maintenance functions is not needed (e.g., when reading manuals online).

Figure 1:
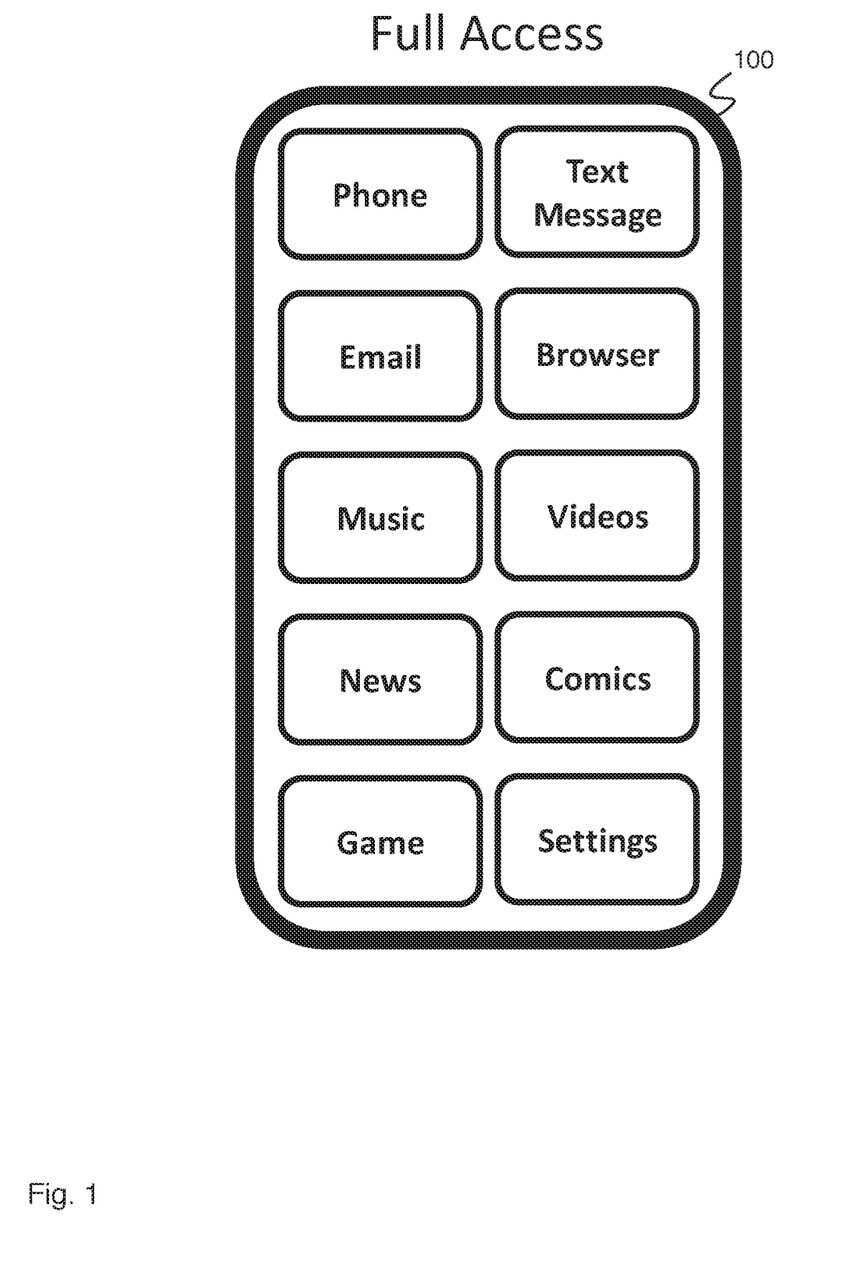
FIG. 1 is a diagram illustrating an embodiment of a computer display.

FIG. 1 is a diagram illustrating an embodiment of a computer display. In some embodiments, computer display 100 comprises a smartphone (e.g., an iPhone™, an Android™ phone, a Microsoft™ Windows™ phone, a Blackberry™ phone, or any other appropriate smartphone). In various embodiments, computer display 100 comprises a desktop computer, a laptop computer, a tablet computer, a wearable computer, or any other appropriate computer. In some embodiments, computer display 100 comprises a full access privacy screen. In the example shown, computer display 100 displays a set of software applications accessible to the computer user. In some embodiments, computer display 100 displays all software applications accessible to the user. In some embodiments, the user using computer display 100 is required to provide authentication (e.g., a password, biometric authentication, etc.) in order to access the display of software applications. Computer display 100 provides access to a phone application, an email application, a music application, a news application, a game application, a text message application, a browser application, a videos application, a comics application, and a settings application.

Figure 2:
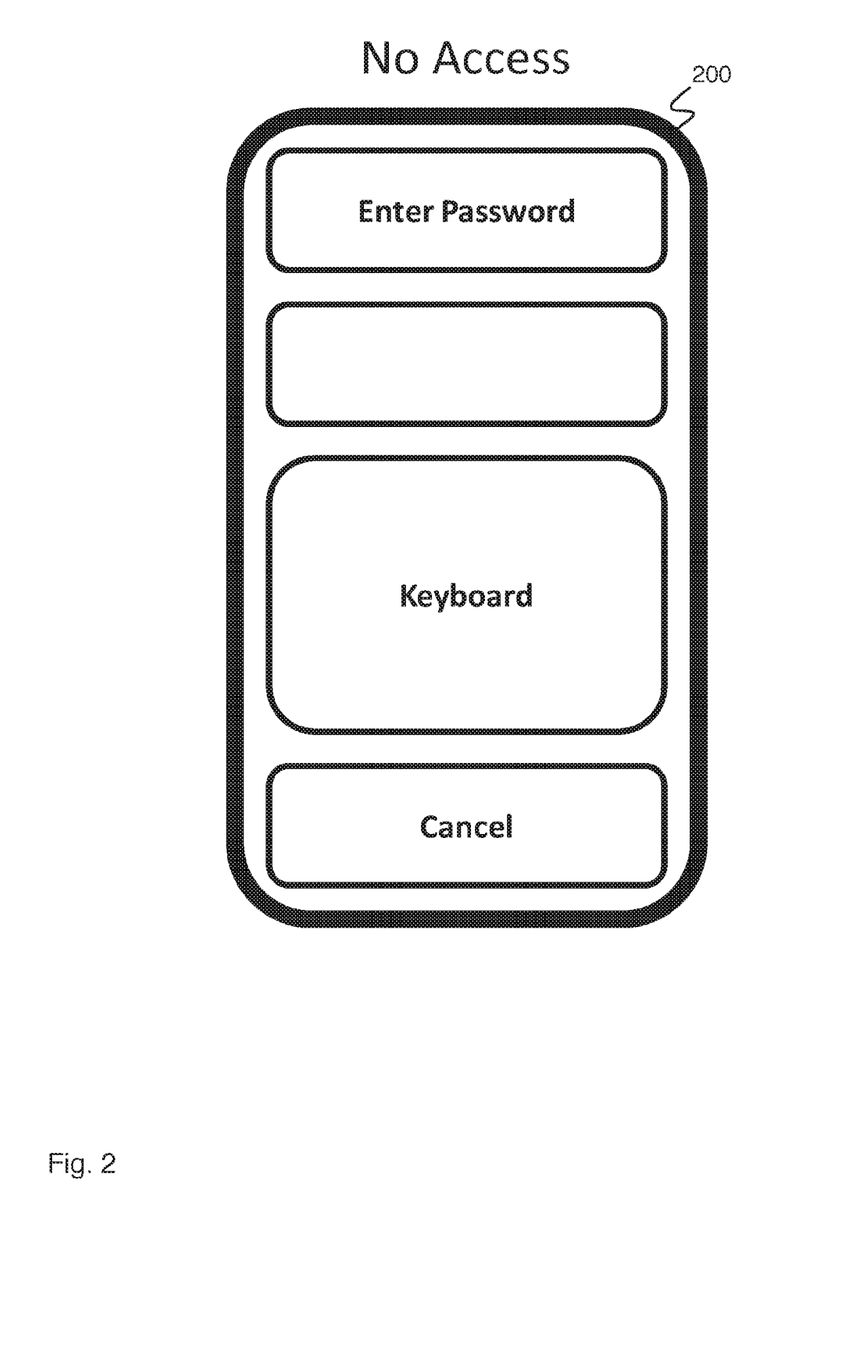
FIG. 2 is a diagram illustrating an embodiment of a computer display showing a no access privacy screen.

FIG. 2 is a diagram illustrating an embodiment of a computer display showing a no access privacy screen. In some embodiments, computer display 200 comprises computer display 100 of FIG. 1 showing a no access privacy screen. In the example shown, a no access privacy screen provides no access to software applications. In some embodiments, a no access screen provides an opportunity to provide authentication (e.g., a password entry interface, a biometric authentication information reader, etc.). In some embodiments, in the event a user provides authentication, the no access privacy screen is removed and the user is shown a full access privacy screen. In some embodiments, in the event a user provides authentication, the no access privacy screen is removed and the user is shown a different privacy screen. In various embodiments, a computer display showing a no access privacy screen is displayed to a user upon system startup (e.g., when the system is turned on), when a privacy screen lease expires (e.g., when a selected privacy screen ceases to be valid), when the system detects suspicious behavior, or in any other appropriate situation.

Figure 3:
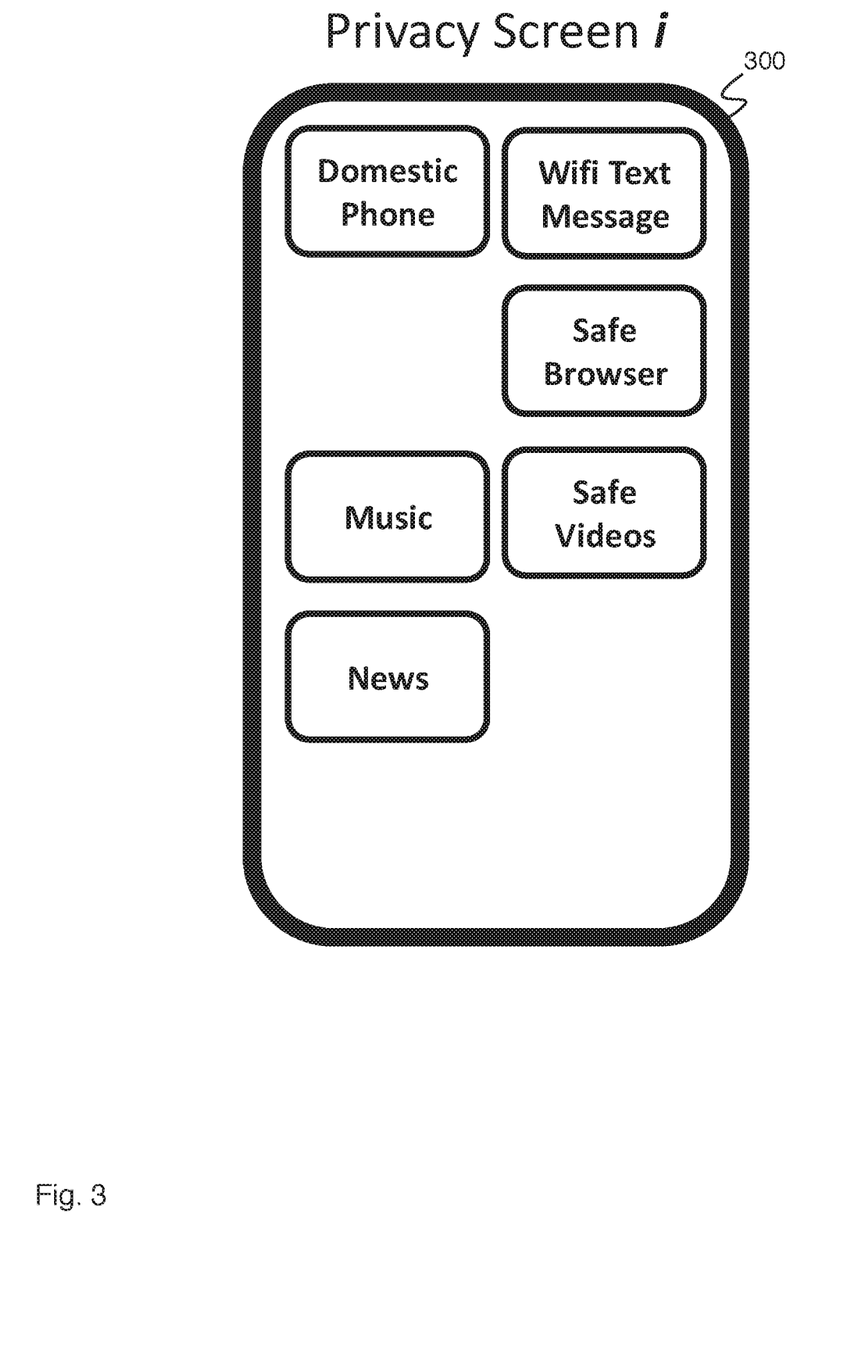
FIG. 3 is a diagram illustrating an embodiment of a computer display showing a privacy screen.

FIG. 3 is a diagram illustrating an embodiment of a computer display showing a privacy screen. In some embodiments, computer display 300 comprises computer display 100 of FIG. 1 showing a privacy screen. In the example shown, computer display 300 shows a set of software applications. In some embodiments, software applications shown by computer display 300 comprise a subset of software applications shown by computer display 100 of FIG. 1. In some embodiments, data accessible by computer display 300 comprises a subset of data accessible by computer display 100 of FIG. 1. In some embodiments, application parameters are applied to applications accessible by computer display 300. In some embodiments, application parameters comprise limitations on the functionality of applications (e.g., limiting the ratings of movies a video player can play, limiting the websites or types of websites a web browser can visit, limiting the area codes a phone can call, etc.). In some embodiments, the privacy screen shown by computer display 300 comprises one of a set of privacy screens accessible by computer display 300. In some embodiments, each privacy screen of the set of privacy screens comprises an independent set of accessible applications and an independent set of application parameters applied to the accessible applications. Computer display 300 provides access to a domestic phone application (e.g., a phone application limited to making domestic calls), a Wifi text message application (e.g., a text message application only able to send text messages over a Wifi, e.g., wireless internet, connection), a safe browser application (e.g., a browser app only capable of visiting sites deemed safe), a music application, a safe videos application (e.g., a video player application only capable of playing videos deemed safe), and a news application. In some embodiments, the privacy screen shown by computer display 300 comprises a lease time (e.g., a time during which the privacy screen is active). In some embodiments, when the lease time is expired, computer display 300 switches from the displayed privacy screen to the no access privacy screen (e.g., the no access privacy screen shown in FIG. 2). In some embodiments, privacy screen 300 is appropriate for restricted access for a child or lent-to-user that the owner-user of a device wants to allow limited access to.

Figure 4:
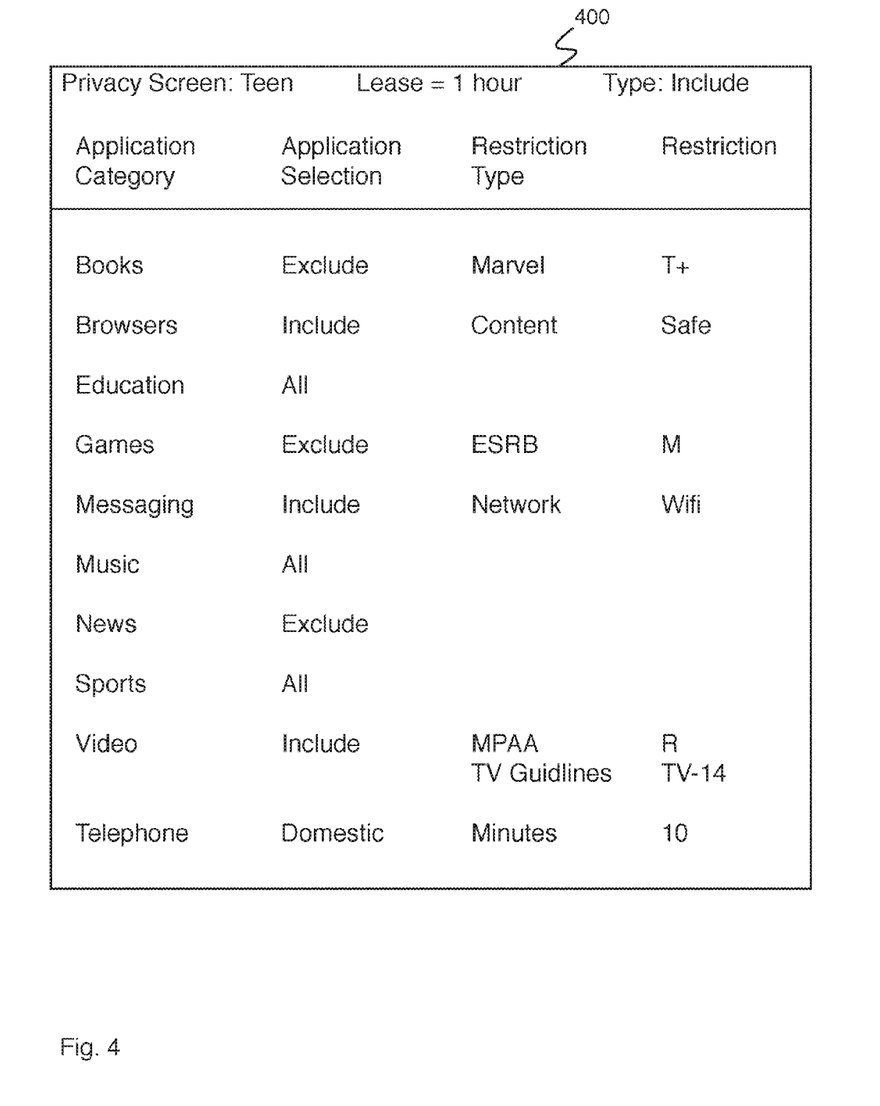
FIG. 4 is a diagram illustrating an embodiment of a privacy screen definition.

FIG. 4 is a diagram illustrating an embodiment of a privacy screen definition. In some embodiments, privacy screen definition 400 comprises a definition of a privacy screen limiting access to applications and limiting the capability of applications on a computer display (e.g., the privacy screen shown by computer display 300 of FIG. 3). In the example shown, privacy screen definition 400 comprises a privacy screen name (e.g., "Teen"), a privacy screen lease time (e.g., 1 hour), and a privacy screen type (e.g., Include). In some embodiments, a lease time indicates an amount of time the privacy screen is available for after it is selected. In some embodiments, when the lease time expires, the computer display automatically transitions to a no access privacy screen. In some embodiments, no lease time is used. In some embodiments a privacy screen type of Include indicates the application category list comprising the privacy screen definition comprises a list of application categories to include (e.g., any application category not listed is excluded). In some embodiments, a privacy screen comprises a privacy screen type of Exclude, indicating the application category list comprising the privacy screen definition comprises a list of application categories to exclude (e.g., any application category not listed is included). In the example shown, privacy screen definition 400 additionally comprises a list of application categories and associated application selections, restriction types, and restrictions. In various embodiments, application categories comprise any appropriate application categories (e.g., books, education, telephone, etc.). An application selection for a category comprises an indication of whether the application category restriction indicates applications that should be included (e.g., "Include"), excluded (e.g., "Exclude"), or whether all applications should be included (e.g., "All"). A restriction type indicates the restriction type applied to the application category (e.g., Motion Picture Association of America (MPAA) ratings for movies, time for movies, time, area code, domestic/international, etc. for telephone calls, Entertainment Software Review Board (ESRB) ratings for video games, time for video games, no limit for educational material, etc.). A restriction type indicates the restriction applied to the application category. In some embodiments, the restriction is specific to the restriction type (e.g., a restriction type can have an associated set of categories, e.g., movie ratings, and the restriction comprises a subset of the set of categories). In some embodiments, the ratings by a particular media rating organization may be used to limit content: Films: MPAA ratings (G, GP, GP-13, R, NC-17); Broadcast television: TV Parental Guidelines ratings (TV-Y, TV-Y7, TV-Y7-FV, TV-G, TV-PG, TV-14, TV-MA); Computer games: ESRB ratings (Early Childhood, Everyone, Everyone 10+, Teen, M, AO, RP); Comic books: Marvel ratings (All Ages, T+, Parental Advisory, Max).

Figure 5:
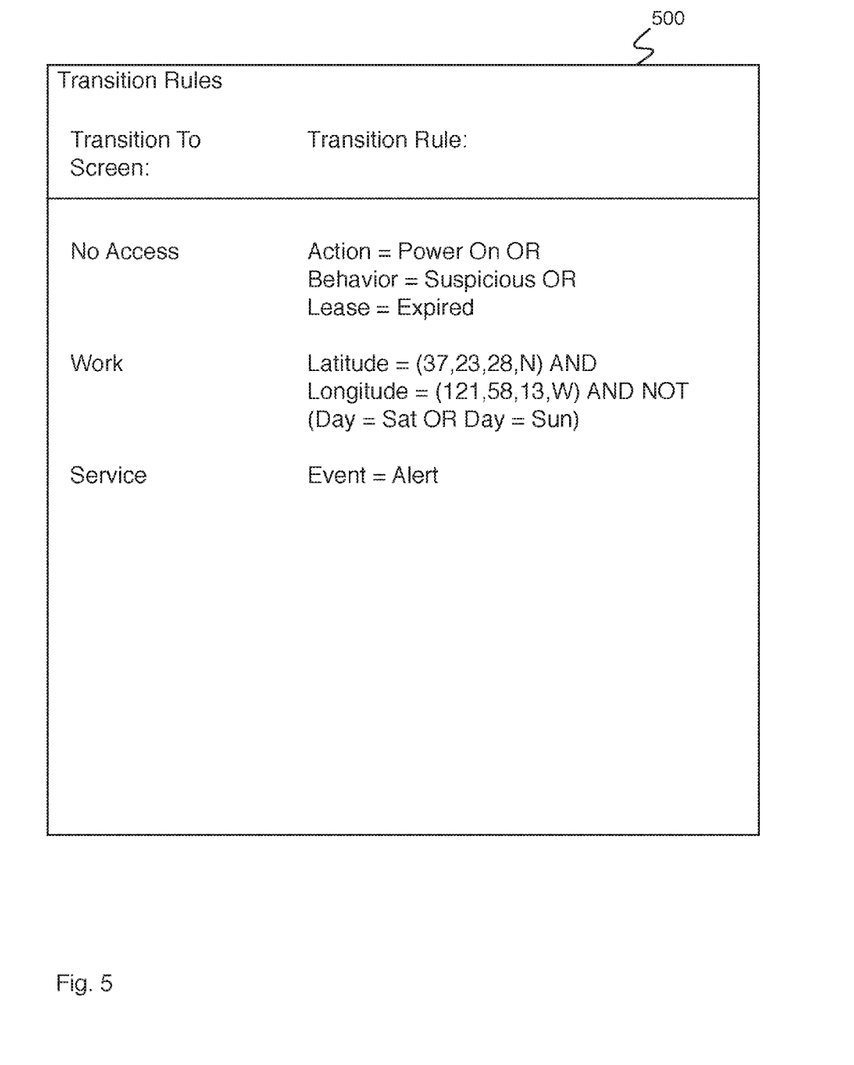
FIG. 5 is a document illustrating an embodiment of a set of transition rules.

FIG. 5 is a document illustrating an embodiment of a set of transition rules. In some embodiments, a transition rule comprises a rule indicating when a computer display (e.g., a computer display as in computer display 100 of FIG. 1) should transition to a new privacy screen. In some embodiments, when a rule indicated in transition rules 500 is satisfied, the computer display begins transitioning to the associated privacy screen. In some embodiments, transitioning to the associated privacy screen comprises authenticating the associated privacy screen. In some embodiments, in the event the current privacy screen comprises an all access privacy screen (e.g., as in computer display 100 of FIG. 1), the transition to a new privacy screen does not require authentication. In the example shown, transition rules 500 comprises a set of privacy screens (e.g., privacy screens defined by privacy screen definitions as in privacy screen definition 400 of FIG. 4). Transition rules 500 additionally comprises a transition rule associated with each transition screen. Each transition rule comprises one or more criteria (e.g., tests of system variables or other stored data). In the event it is determined that the one or more criteria for a system rule are satisfied according to the rule, the rule is satisfied and the associated privacy screen is selected. In the event more than one transition rule is satisfied simultaneously, the rule that appears first on the list is selected (e.g., according to a listed priority). In some embodiments, there is an explicit ranking for priority (e.g., a number ranking, etc.). In the example shown, a no access privacy screen is selected in the event that a power on action is detected or suspicious behavior (e.g., many attempts to access device but failure to acceptably authorize) is detected or a privacy screen lease is expired. A work privacy screen is selected in the event that the latitude is determined to be 37°, 23', 28" north and longitude is determined to be 121°, 58', 13" west (e.g., the computer is determined to be at a work location), and the day is determined to not be Saturday or Sunday. A service privacy screen is selected in the event that an alert event is detected. In various embodiments, privacy screen transitions are based on time of day, calendar date, user behavior, user identity, a system event, location, or on any other appropriate criteria.

Figure 6:
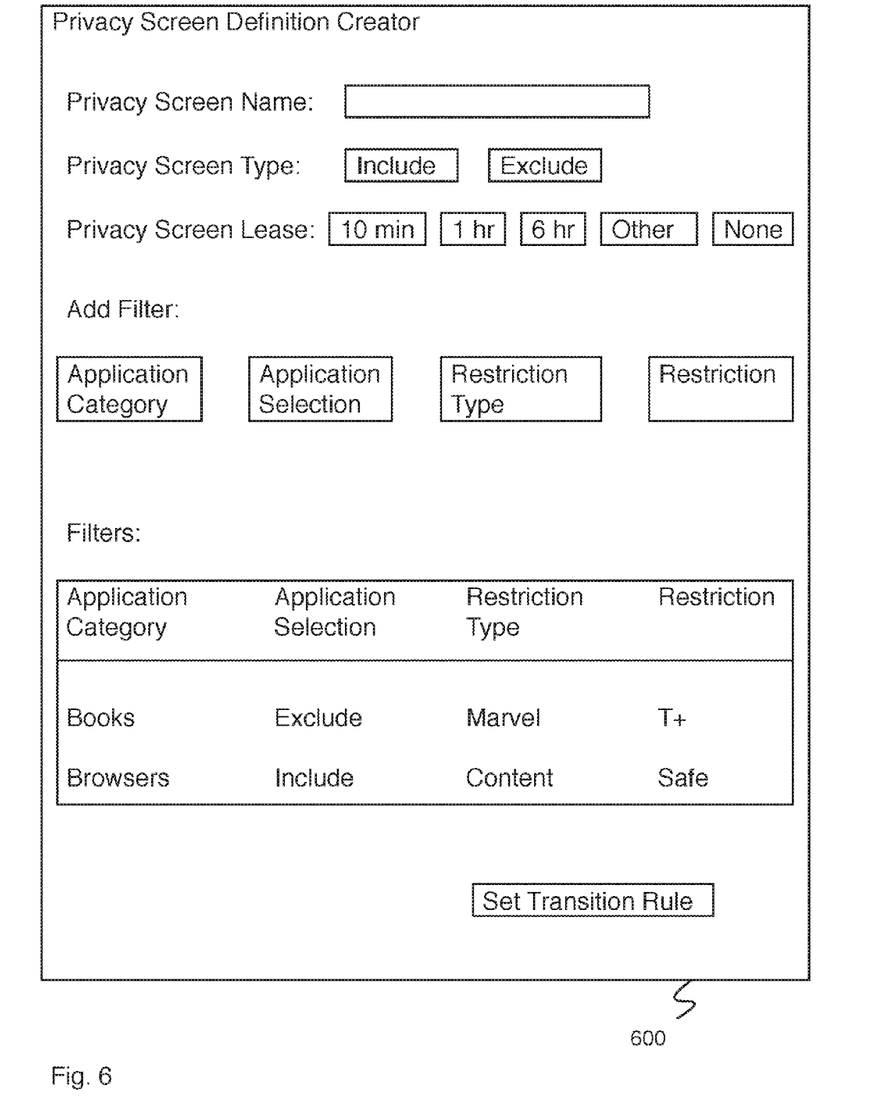
FIG. 6 is a diagram illustrating an embodiment of a privacy screen definition creator.

FIG. 6 is a diagram illustrating an embodiment of a privacy screen definition creator. In some embodiments, privacy screen definition creator 600 comprises a user interface for creating a privacy screen definition (e.g., privacy screen definition 400 of FIG. 4). In the example shown, privacy screen definition creator 600 comprises a privacy screen name entry user interface, a privacy screen type selector, and a privacy screen lease time selector. Privacy screen definition creator 600 additionally comprises a user interface for adding a filter, including selectors for application category, application selection, restriction type, and restriction. In some embodiments, restriction type options are based at least in part on a selected application category (e.g., video player applications can restrict based on movie ratings or television ratings, telephone applications can restrict based on area code, domestic/international, or time, etc.). In some embodiments, restrictions are based at least in part on a selected restriction type (e.g., a movie rating restriction can be G, PG, PG-13, or R, an area code restriction can be any valid area code, etc.). Privacy screen definition creator additionally comprises a set transition rule button for initiating a set transition rule interface (e.g., for adding a transition rule to a set of transition rules, e.g., transition rules 500 of FIG. 5).

Figure 7:
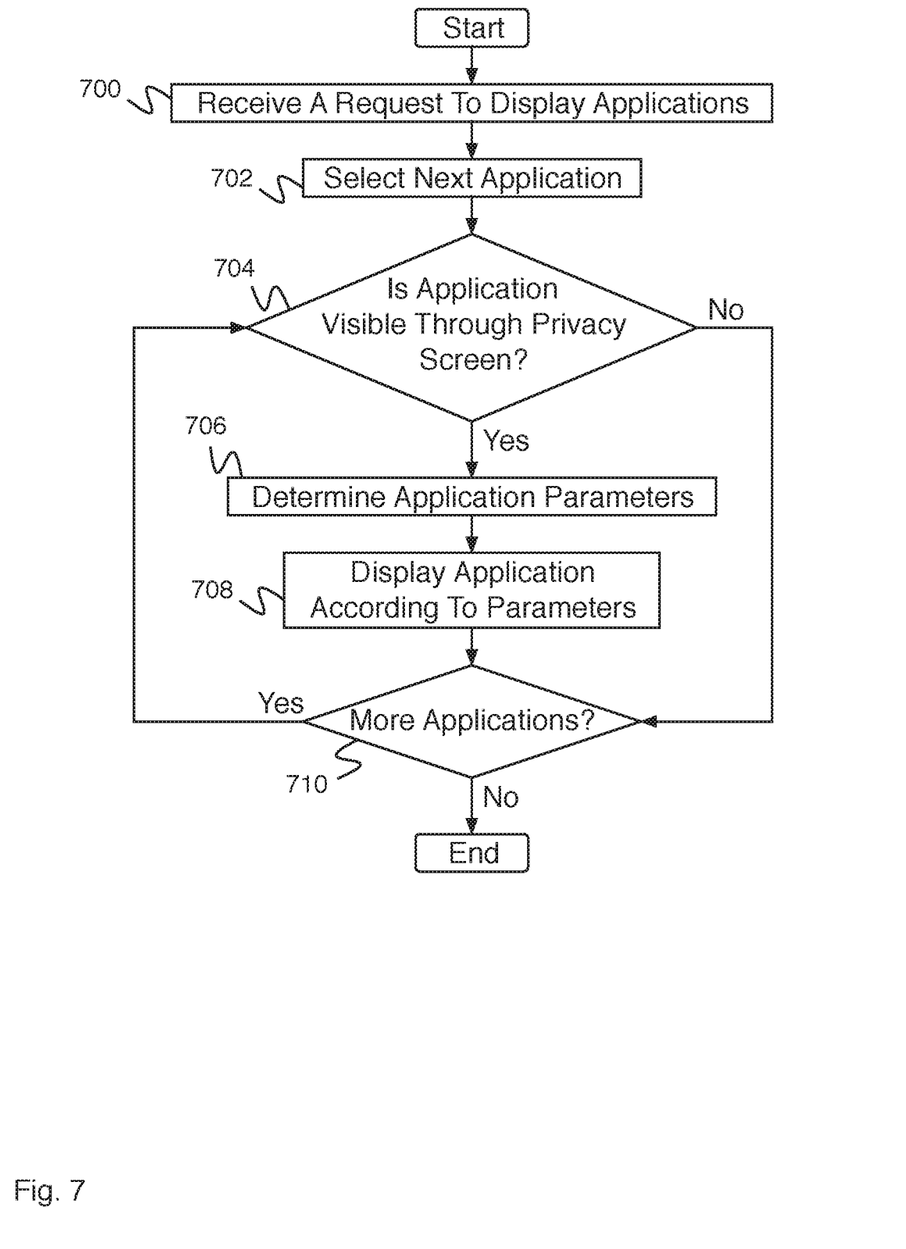
FIG. 7 is a flow diagram illustrating an embodiment of a process for displaying a set of applications through a privacy screen.

FIG. 7 is a flow diagram illustrating an embodiment of a process for displaying a set of applications through a privacy screen. In some embodiments the process of FIG. 7 is used for a computer display showing a privacy screen (e.g., computer display 300 of FIG. 3). In the example shown, in 700, a request is received to display applications. In 702, a next application is selected. In some embodiments, the next application comprises the first application. In 702, it is determined if the selected application is visible through the privacy screen. In 704, it is determined if the selected application is visible through the privacy screen. For example, visibility is determined based at least in part on using a privacy screen definition (e.g., privacy screen definition 400 of FIG. 4). In the event it is determined that the application is not visible through the privacy screen, control passes to 710. In the event it is determined that the application is visible through the privacy screen, control passes to 706. In 706, application parameters are determined. In 708, the application is displayed according to the parameters (e.g., a phone application is displayed as a domestic phone application, etc.). In 710, it is determined if there are more applications. In the event it is determined that there are more applications, control passes to 704. In the event it is determined that there are not more applications, the process ends.

Figure 8:
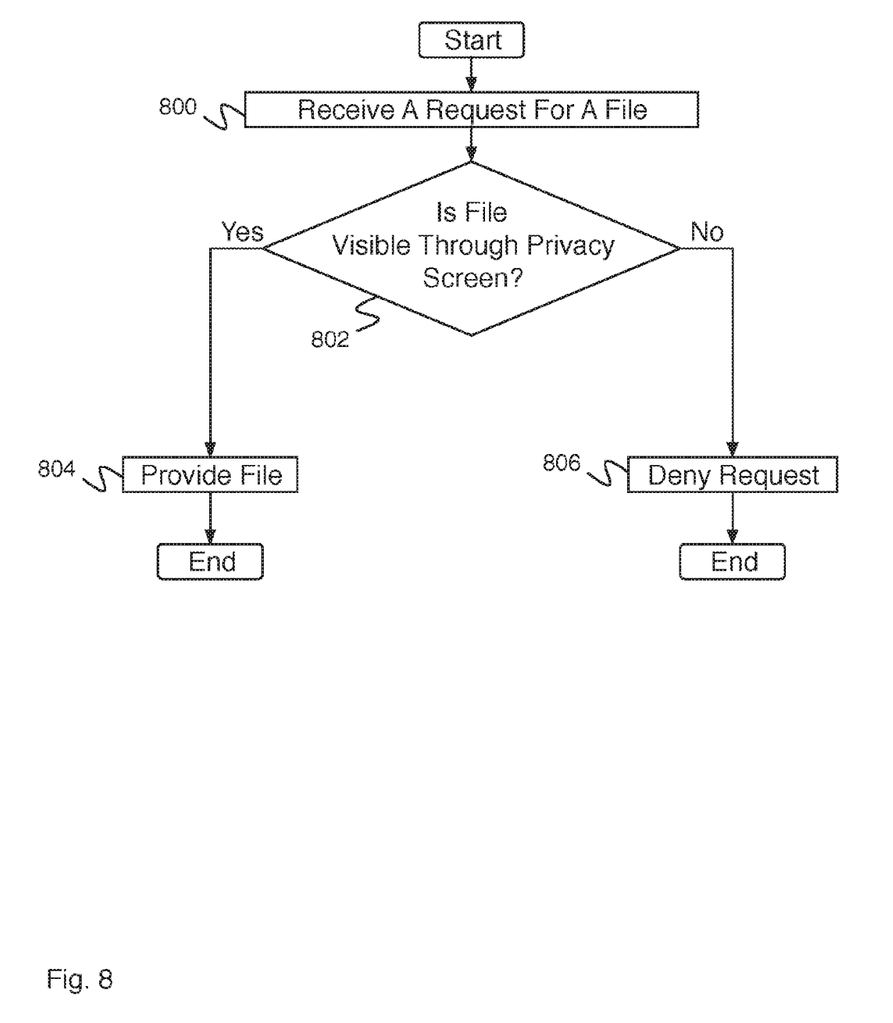
FIG. 8 is a flow diagram illustrating an embodiment of a process for providing a file through a privacy screen.

FIG. 8 is a flow diagram illustrating an embodiment of a process for providing a file through a privacy screen. In 800, a request for a file is received (e.g., by a computer system). In some embodiments, the request for a file is received from an application. In 802, it is determined if the file is visible through the privacy screen. In some embodiments, determining if the file is visible through the privacy screen comprises determining application parameters limiting the function of the application providing the request for the file (e.g., using a privacy screen definition e.g., privacy screen definition 400 of FIG. 4). In some embodiments, determining if the file is visible through the privacy screen comprises determining if access to the file is restricted to the requesting application. If it is determined that the file is visible through the privacy screen, control passes to 804. In 804, the file is provided (e.g., to the requesting application), and the process ends. If it is determined in 802 that the file is not visible through the privacy screen, control passes to 806. In 806, the request is denied.

In some embodiments, a request is received to view content and the system determines whether a file is to be made visible. If a visible file is requested to be viewed, the file is provided. Non-visible files presumably will not be able to be viewed and so should not ever be associated with a request to be viewed, but the file can be denied for a request to be viewed if it is so requested.

Figure 9:
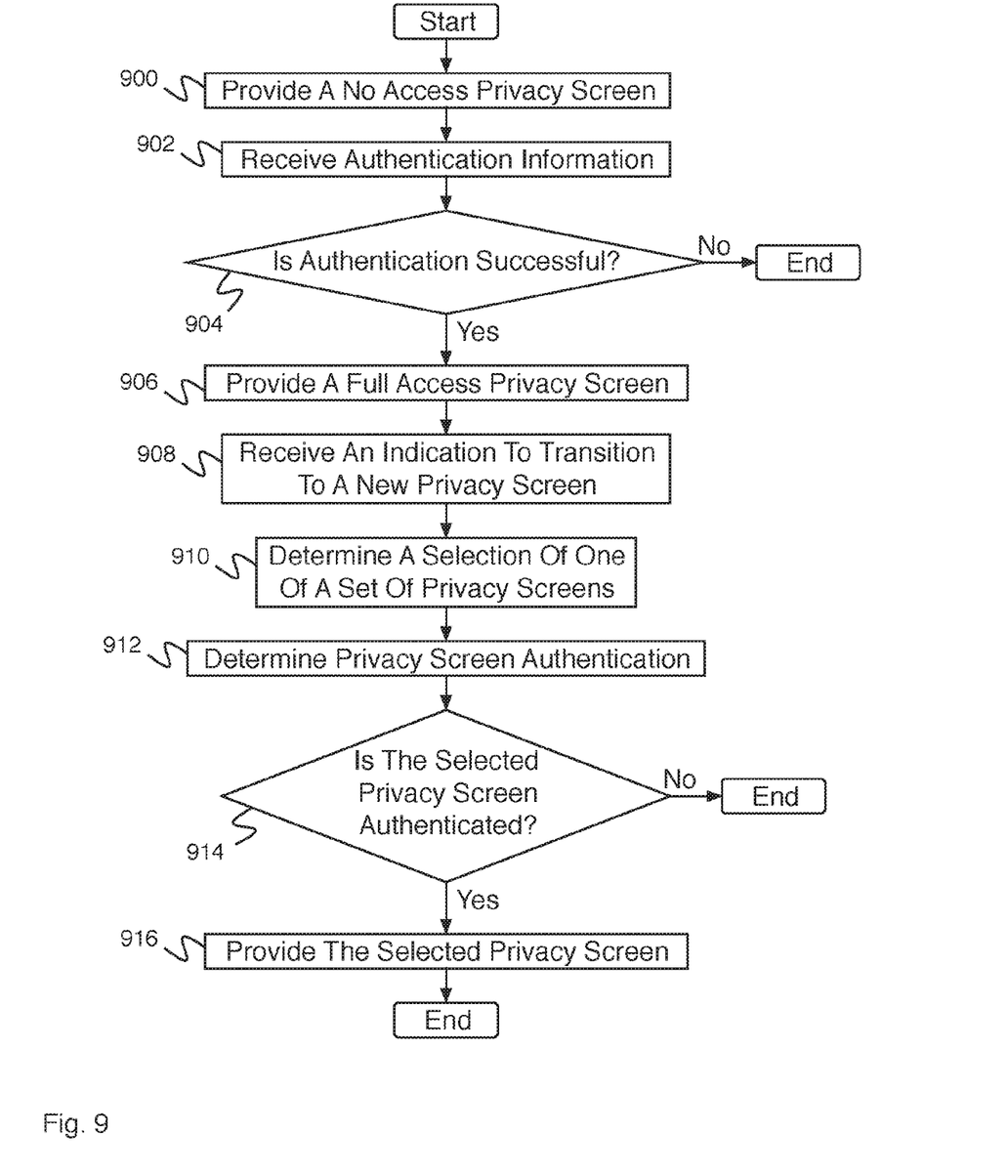
FIG. 9 is a flow diagram illustrating an embodiment of a process for privacy screen-based security.

FIG. 9 is a flow diagram illustrating an embodiment of a process for privacy screen-based security. In some embodiments, the process of FIG. 9 is used for displaying privacy screens on a computer display (e.g., computer display 100 of FIG. 1, computer display 200 of FIG. 2, or computer display 300 of FIG. 3). In the example shown, in 900, a no access privacy screen is provided (e.g., as in computer display 200 of FIG. 2 showing a no access privacy screen). In 900, authentication information is received. In various embodiments, authentication information comprises a password, biometric information, pattern information, image information, or any other appropriate authentication information. In 904, it is determined whether authentication is successful (e.g., whether the authentication information received in 902 successfully authenticates the user). In the event it is determined that authentication is not successful, the process ends. In some embodiments, instead of the process ending, control passes to 900. In the event it is determined that authentication is successful, control passes to 906. In 906, a full access privacy screen is provided (e.g., as in computer display 100 of FIG. 1 showing a full access privacy screen). In some embodiments, a full access privacy screen provides access to a set of applications or data. In some embodiments, authentication is for a privacy screen (e.g., a restricted screen) and instead of providing a full access privacy screen, access is provided to the restricted privacy screen.

In 908, an indication to transition to a new privacy screen is received. In some embodiments, an indication to transition to a new privacy screen is received as a result of a transition rule being satisfied (e.g., a transition rule as indicated in transition rules 500 of FIG. 5). In some embodiments, a manual indication to transition to a new privacy screen is received. In various embodiments, a manual indication to transition to a new privacy screen comprises pushing a button, an indication to a graphical user interface object, an audible command, a mouse gesture, a physical gesture, or any other appropriate indication. In some embodiments, the indication to transition is received from a process that monitors the transition rules and state of the system (e.g., location, time, usage, etc.) to determine if a transition rule has been triggered in which case the process provides an indication to transition to a new privacy screen as indicated by the triggered transition rule.

In 910 a selection of one of a set of privacy screens is determined. In some embodiments, the selection of one of a set of privacy screens is received as part of the indication to transition to a new privacy screen (e.g., the indication to transition to a new privacy screen is received as a result of a transition rule being satisfied, and the indication to transition to a new privacy screen comprises a selection of a privacy screen). In some embodiments, determining a selection of one of a set of privacy screens comprises determining a selection of one of a set of privacy screens according to a transition rule. In various embodiments, a transition rule comprises a transition rule based on time of day, calendar date, user behavior, user identity, a system event, location, or on any other appropriate criteria. In some embodiments, the selection of one of a set of privacy screens comprises a manual selection of one of a set of privacy screens.

In 912, privacy screen authentication is determined. In some embodiments, determining privacy screen authentication comprises prompting for authentication information. In some embodiments, determining privacy screen authentication information comprises checking authentication information previously received (e.g., authentication information received in 902). In 914, it is determined whether the selected privacy screen is authenticated. In the event the selected privacy screen is not authenticated, the process ends. In some embodiments, in the event that the selected privacy is not authenticated, control passes to the previous privacy screen (e.g., the full access screen, other privacy screen, etc.). In the event the selected privacy screen is authenticated, control passes to 916. In 916, the selected privacy screen is provided (e.g., as in computer display 300 of FIG. 3 showing a privacy screen). In some embodiments, the selected privacy screen limits access to a subset of the set of applications or data. In some embodiments, after 916, control passes to 908 instead of ending.

Figure 10:
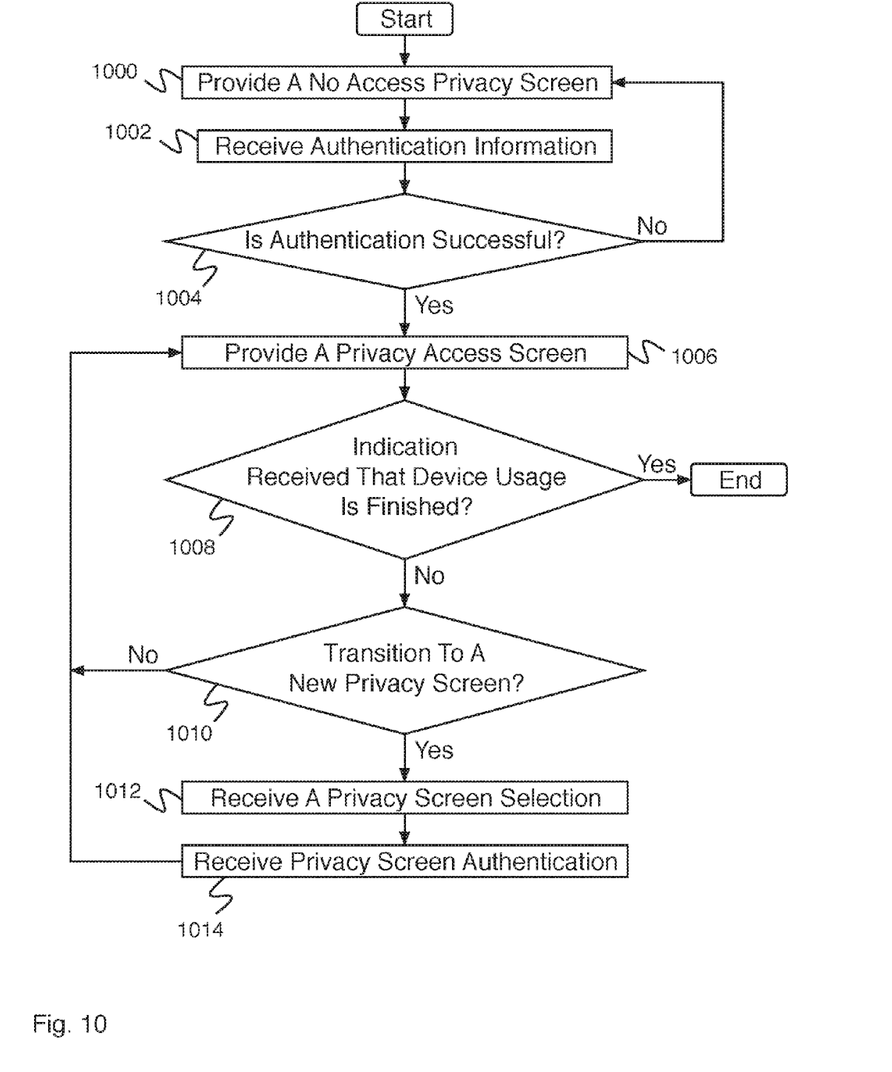
FIG. 10 is a flow diagram illustrating an embodiment of a process for a privacy screen.

FIG. 10 is a flow diagram illustrating an embodiment of a process for a privacy screen. In some embodiments, the process of FIG. 10 is used for displaying privacy screens on a computer display (e.g., computer display 100 of FIG. 1, computer display 200 of FIG. 2, or computer display 300 of FIG. 3). In the example shown, in 1000, a no access privacy screen is provided. For example, a no access privacy screen is presented by the system to a user that enables the user only to authenticate in order to gain access to the system. In 1002, authentication information is received. For example, a password, a biometric identifier (e.g., a fingerprint, a retinal scan, etc.) are received that can authenticate the identity of a user. In 1004, it is determined whether the authentication is successful. For example, whether the identity of the user is of a user that has access rights to the system. In the event that the authentication is not successful, control passes to 1000. In the event that the authentication is successful, in 1006, a privacy access screen is provided. For example, based on the authentication a pricy screen is provided (e.g., a full access privacy screen is provided to a full access authenticated user, a restricted access privacy screen is provided to a restricted access authenticated user, etc.).

In 1008, it is determined whether an indication is received that device usage is finished. For example, it is determined whether an indication is received that device usage is finished by receiving an indication that a session is over (e.g., an end button is pushed on a user interface, a timer expires, a period of time passes with no use, a battery saving timeout is reached, etc.). In the event that it has been determined that an indication is received that device usage is finished, then the process ends. In the event that it has been determined that an indication is not received that device usage is finished, in 1010 it is determined whether to transition to a new privacy screen. In the event that it is determined not to transition to a new privacy screen, control passes to 1006. In some embodiments, in the event that the privacy access screen has already been provided and no other action is received, then in 1006 no new privacy access screen is required to be provided. In the event that it is determined to transition to a new privacy screen, in 1012 a privacy screen selection is received. For example, based on the transition triggered a privacy screen is selected. In 1014, a privacy screen authentication is received. For example, a user is prompted for authentication associated with the transition to a selected privacy screen. In some embodiments, no authentication is required after a transition. Control passes to 1006.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for privacy screen-based security, comprising:
   an input interface configured to receive authentication information; and
   a processor configured to:
      in the event authentication is determined to be successful:
         provide a first privacy access screen, wherein the first privacy access screen provides access to a first set of applications or data;
         determine whether to automatically transition to a second privacy screen or a third privacy screen, wherein the transition to the second privacy screen is determined based on a first priority, wherein the transition to the third privacy screen is determined based on a second priority;
         compare the first priority of the second privacy access screen with the second priority of the third first privacy access screen;
         in the event that the first priority is greater than the second priority, receive an automated indication to transition from the first privacy access screen to the second privacy access screen, wherein the second privacy access screen provides access to a second set of applications or data, the second privacy access screen being different from the first privacy access screen;
         in the event that the second priority is greater than the first priority, receive an automated indication to transition from the first privacy access screen to the third privacy access screen, wherein the third privacy access screen provides access to a third set of applications or data, the third privacy access screen being different from the first privacy access screen and the second privacy access screen; and
         transition from the first privacy access screen to the second or third privacy access screen based on the receipt of the automated indication.

2. A system as in claim 1, wherein the processor is further configured to provide a no access privacy screen.

3. A system as in claim 1, wherein the input interface is further configured to receive an indication to transition to a second or a third privacy screen.

4. A system as in claim 1, wherein the specific set of circumstances comprises being at a location.

5. A system as in claim 4, wherein the location comprises a work location.

6. A system as in claim 1, wherein the specific set of circumstance comprises a day of the week being a specific day.

7. A system as in claim 6, wherein the day comprises a Saturday or a Sunday.

8. A system as in claim 1, wherein the specific set of circumstance comprises a time of the day being a specific time.

9. A system as in claim 1, wherein the specific set of circumstance comprises a calendar date being a specific date.

10. A system as in claim 1, wherein the specific set of circumstance comprises a user behavior being a specific behavior.

11. A system as in claim 10, wherein the specific behavior comprises a suspicious behavior.

12. A system as in claim 11, wherein the suspicious behavior comprises a failed access attempt.

13. A system as in claim 1, wherein the specific set of circumstance comprises a system event being a specific event.

14. A system as in claim 1, wherein the specific set of circumstance is based at least in part on a least time.

15. A system as in claim 1, wherein authentication information comprises a password.

16. A system as in claim 1, wherein authentication information comprises biometric information.

17. A method for privacy screen-based security, comprising:

receiving authentication information; and in the event authentication is determined, using a processor, to be successful:

providing a first privacy access screen, wherein the first privacy access screen provides access to a first set of applications or data; and determining whether to automatically transition to a second privacy screen or a third privacy screen, wherein the transition to the second privacy screen is determined based on a first priority, wherein the transition to the third privacy screen is determined based on a second priority;

compare the first priority of the second privacy access screen with the second priority of the third first privacy access screen;

in the event that the first priority is greater than the second priority, receive an automated indication to transition from the first privacy access screen to the second privacy access screen, wherein the second privacy access screen provides access to a second set of applications or data, the second privacy access screen being different from the first privacy access screen;

in the event that the second priority is greater than the first priority, receive an automated indication to transition from the first privacy access screen to the third privacy access screen, wherein the third privacy access screen provides access to a third set of applications or data, the third privacy access screen being different from the first privacy access screen and the second privacy access screen; and transition from the first privacy access screen to the second or third privacy access screen based on the receipt of the automated indication.

18. A computer program product for privacy screen-based security, the computer program product being embodied in a non-transitory computer readable storage medium and comprising computer instructions for:

receiving authentication information; and in the event authentication is determined, using a processor, to be successful:

providing a first privacy access screen, wherein the first privacy access screen provides access to a first set of applications or data; and determining whether to automatically transition to a second privacy screen or a third privacy screen, wherein the transition to the second privacy screen is determined based on a first priority, wherein the transition to the third privacy screen is determined based on a second priority;

compare the first priority of the second privacy access screen with the second priority of the third first privacy access screen;

in the event that the first priority is greater than the second priority, receive an automated indication to transition from the first privacy access screen to the second privacy access screen, wherein the second privacy access screen provides access to a second set of applications or data, the second privacy access screen being different from the first privacy access screen;

in the event that the second priority is greater than the first priority, receive an automated indication to transition from the first privacy access screen to the third privacy access screen, wherein the third privacy access screen provides access to a third set of applications or data, the third privacy access screen being different from the first privacy access screen and the second privacy access screen; and transition from the first privacy access screen to the second or third privacy access screen based on the receipt of the automated indication.

* * * * *